(12) United States Patent
André et al.

(10) Patent No.: US 9,590,734 B2
(45) Date of Patent: Mar. 7, 2017

(54) METHOD FOR DATA PROCESSING IN AN OPTICAL NETWORK COMPONENT AND OPTICAL NETWORK COMPONENT

(75) Inventors: Paulo André, Aveiro (PT); Daniel Fonseca, Lisbon (PT); Rui Meleiro, Viscu (PT); Paulo Miguel Monteiro, Ilhavo (PT); Rui Morais, Carnaxide (PT); Lara Pellegrino, Moscavide (PT)

(73) Assignee: Xieon Networks S.a.r.l., Luxembourg (LU)

( * ) Notice: Subject to any disclaimer, the term of this patent is extended or adjusted under 35 U.S.C. 154(b) by 131 days.

(21) Appl. No.: 13/254,896

(22) PCT Filed: Mar. 4, 2009

(86) PCT No.: PCT/EP2009/052541
§ 371 (c)(1),
(2), (4) Date: Nov. 21, 2011

(87) PCT Pub. No.: WO2010/099820
PCT Pub. Date: Sep. 10, 2010

(65) Prior Publication Data
US 2012/0057883 A1    Mar. 8, 2012

(51) Int. Cl.
| H04B 10/06 | (2006.01) |
| H04L 27/01 | (2006.01) |
| H04B 10/2587 | (2013.01) |
| H04L 27/02 | (2006.01) |
| H04J 14/02 | (2006.01) |

(52) U.S. Cl.
CPC .......... *H04B 10/2587* (2013.01); *H04J 14/02* (2013.01); *H04J 14/0282* (2013.01); *H04L 27/02* (2013.01); *H04J 14/025* (2013.01); *H04J 14/0227* (2013.01); *H04J 14/0246* (2013.01); *H04J 14/0265* (2013.01)

(58) Field of Classification Search
CPC .......................... H04J 14/0282; H04J 14/0227
USPC ......................................................... 389/206
See application file for complete search history.

(56) References Cited

U.S. PATENT DOCUMENTS

| 7,474,460 B2 * | 1/2009 | Fujiwara et al. ............. 359/344 |
| 8,131,156 B2 * | 3/2012 | Yu ................................. 398/168 |
| 2004/0213574 A1 * | 10/2004 | Han et al. ....................... 398/71 |

(Continued)

FOREIGN PATENT DOCUMENTS

| FR | 2 896 932 A1 | 8/2007 |
| JP | 7 212 308 A | 8/1995 |

(Continued)

OTHER PUBLICATIONS

Vincent Roncin (1), Quang-Trung Le (1), Julien Poette (1 ), Sebastien Lobo (1 ), Laurent Bramerie (1) and Jean-Claude Simon (1) (Passive All-optical Clock Recovery demonstration at 42.66 Gbit/s with Bragg-gratings based Fabry-Perot Filter).*

(Continued)

*Primary Examiner* — Shi K Li
*Assistant Examiner* — Mina Shalaby
(74) *Attorney, Agent, or Firm* — Nelson Mullins Riley & Scarborough LLP (57) ABSTRACT

A method for data processing in an optical network component includes filtering and optically equalizing an incoming optical signal and modulating the optically equalized signal. A corresponding optical network component is also provided.

18 Claims, 9 Drawing Sheets

(56) References Cited

U.S. PATENT DOCUMENTS

| | | | |
|---|---|---|---|
| 2006/0093360 A1* | 5/2006 | Kim et al. | 398/71 |
| 2008/0317468 A1 | 12/2008 | Villarruel et al. | |
| 2010/0142950 A1* | 6/2010 | Pincemin et al. | 398/58 |
| 2010/0215368 A1* | 8/2010 | Qian et al. | 398/67 |
| 2010/0278535 A1* | 11/2010 | Kim | 398/72 |
| 2010/0329680 A1* | 12/2010 | Presi et al. | 398/79 |
| 2011/0026923 A1* | 2/2011 | Kim et al. | 398/79 |

FOREIGN PATENT DOCUMENTS

| | | | |
|---|---|---|---|
| JP | 411121845 | * | 4/1999 |
| JP | 411121845 A | * | 4/1999 |

OTHER PUBLICATIONS

Passive All-optical Clock Recovery demonstration at 42.66 Gbit/s with Bragg-gratings based Fabry-Perot Filter, 2007.*

* cited by examiner

METHOD FOR DATA PROCESSING IN AN OPTICAL NETWORK COMPONENT AND OPTICAL NETWORK COMPONENT

BACKGROUND OF THE INVENTION

Field of the Invention

The invention relates to a method and to a device for data processing in an optical network component and to an optical network component.

An increasing demand for bandwidth from operators leads to solutions that comprise optical technology not only for long-haul systems, but also for metro and access networks, including Passive Optical Networks (PONs). This is a low cost solution that improves available bandwidth and achievable distance compared to an electrical access technology.

Figure 1:
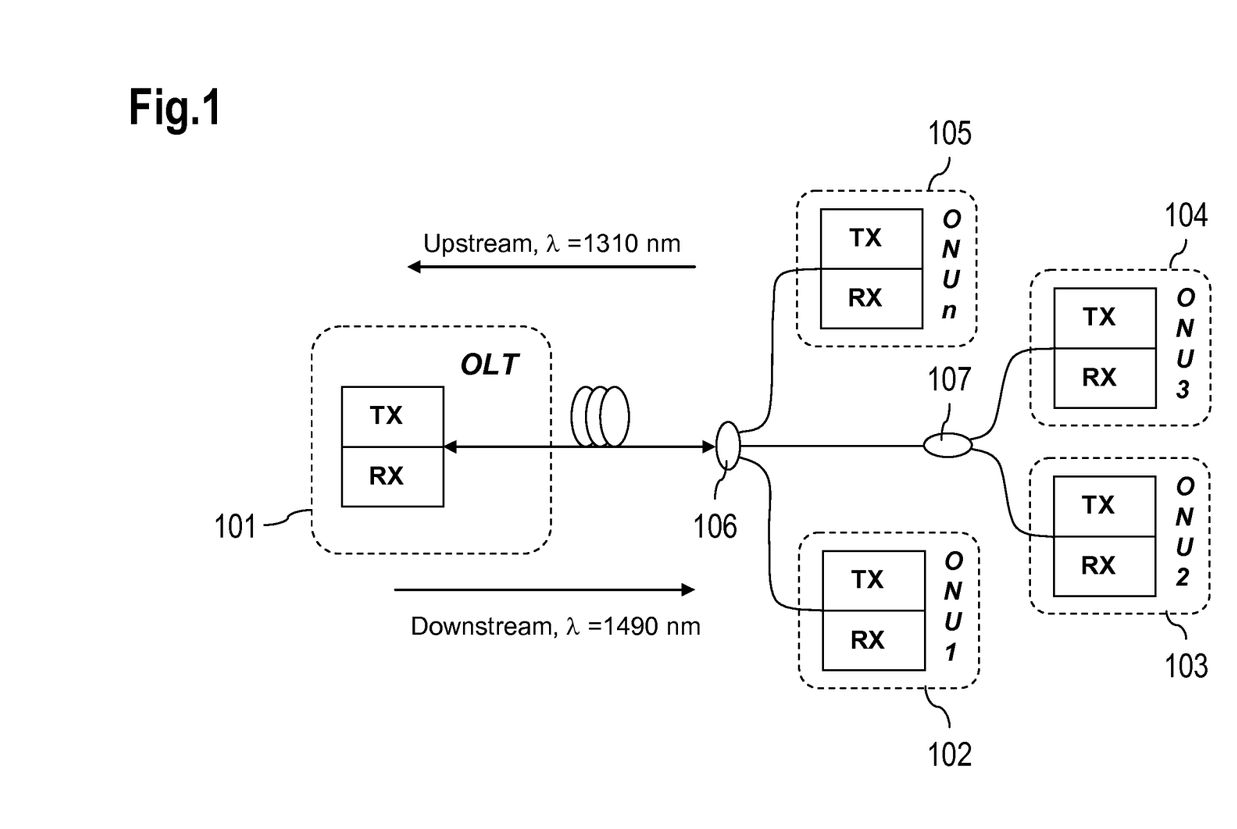

FIG. 1 shows an illustration of a PON comprising an Optical Line Terminal OLT 101 and several Optical Network Units ONUs 102 to 105. The OLT 101 as well as the ONUs 102 to 105 each comprises a transmitter TX and a receiver RX. The OLT 101 is connected via a splitter/combiner 106 to the ONU 102 and the ONU 105 as well as to a splitter/combiner 107, which is further connected to the ONUs 103, 104.

A communication between the OLT and the ONUs is referred to as downstream transmission, whereas the inverse flow of information is termed upstream transmission.

An architecture for establishing communication in both upstream and downstream directions provides an unidirectional implementation via two separate fibers, wherein both a transmitter and a receiver are deployed at both ends of the network. A bidirectional communication of upstream and downstream traffic via a single fiber may also be a feasible transmission scheme.

In a standard-compliant PON, two different wavelengths are assigned for data exchange with end-users comprising a wavelength for an upstream direction (around 1310 nm) and another wavelength for a downstream direction (around 1490 nm). As multiple ONUs are connected to one OLT, the available bandwidth can be shared between end-users by a time domain multiplexing (TDM) technique.

Modulation formats utilized in the optical domain may comprise amplitude-shift keying (ASK), frequency-shift keying (FSK), and phase-shift keying (PSK). One modulation is to change a signal power between two levels, which is also referred to as "non-return-to-zero on-off keying" (NRZ-OOK) modulation. Advantageously, this NRZ-OOK modulation can be used in a bidirectional way between the OLT and the ONUs, because PONs' standards support this kind of modulation, which allows for an efficient and relative simple implementation at the transmitter side as well as at the receiver side.

Nowadays, these networks experience heavy traffic and congestion due to triple play services. Wavelength-division-multiplexed (WDM) PONs appear to be a technique to overcome such limitations, because, among other advantages, it supplies a dedicated wavelength to each end user.

Figure 2:
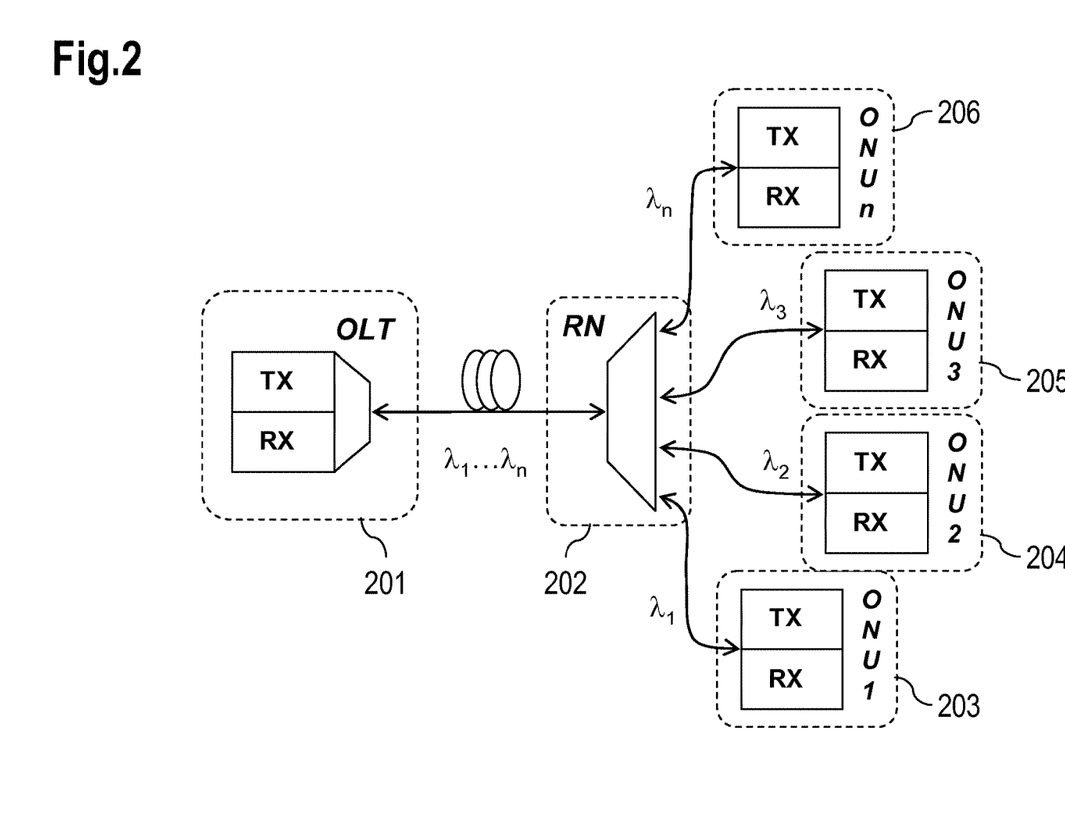

FIG. 2 shows an illustration of a bidirectional WDM PON comprising an OLT 201, a remote node RN 202 and several ONUs 203 to 206. The OLT 201 as well as the ONUs 203 to 206 each comprises a transmitter TX and a receiver RX. The OLT 201 is connected via an optical fiber with the RN 202 and the RN 202 is further connected with each of the ONUs 203 to 206.

As shown in FIG. 2, the WDM approach improves a network's capacity in a bidirectional WDM-PON due to transport of several wavelengths (channels) via the same optical fiber, i.e., several channels are aggregated (by a multiplexer equipment) before transmission and are demultiplexed (by a demultiplexer equipment) after transmission. In the RN 202, wavelengths are separated and each ONU 203 to 206 receives one of the separated wavelength.

BRIEF SUMMARY OF THE INVENTION

The problem to be solved is to overcome disadvantages of existing optical networks or network components and in particular to provide for an efficient approach for, e.g., optical data processing.

This problem is solved according to the features of the independent claims. Further embodiments result from the depending claims.

In order to overcome this problem, a method is provided for data processing in an optical network component, in particular in an optical network,
 wherein an incoming optical signal is filtered and optically equalized,
 wherein the optically equalized signal is modulated.

The optical network component may be any network component providing optical processing means optionally together with electrical processing capability.

The proposed solution allows using the PON standard compliant NRZ-OOK data formats on both upstream as well as downstream directions (at bit rates up to, e.g., 10 Gbit/s), with complete bandwidth usage, via a single fiber, utilizing colorless ONUs and introducing no changes at the OLT. Hence, the approach provided herein may in particular be bandwidth-efficient, supports full-duplex transmission and allows for OOK modulation without any need for expensive tunable lasers at the ONU.

In an embodiment, the filtered signal is equalized by reducing or eliminating amplitude fluctuations of the filtered signal.

In another embodiment, the filtered signal is equalized via a saturation property of an optical amplifier, wherein in particular a low-level signal is processed with a higher gain than a high-level signal.

In a further embodiment, the filtered signal is equalized via an erbium doped fiber amplifier in particular in combination with at least one SOA.

In a next embodiment, the filtered signal is equalized via at least two amplifiers, in particular at least two serially connected SOAs.

It is also an embodiment that the optical signal is filtered via a bandpass filter providing transmission peaks at channel wavelengths.

These transmission peaks at the channel wavelengths allow for a recovery of at least one optical carrier. This enables the network element to be agnostic to other wavelengths received. Only the wavelengths to be recognized may pass the filter.

Pursuant to another embodiment, the optical signal is filtered via at least one of the following:
 a Fabry-Perot filter;
 a Fabry-Perot Bragg grating, in particular a single cavity Fabry-Perot Bragg grating;
 a pi-shift fiber Bragg grating.

According to an embodiment, the optically equalized signal is modulated by a Mach Zehnder modulator or by an electro absorption modulator.

According to another embodiment, the incoming optical signal is also conveyed to a receiver.

Hence, a splitter may be provided to convey said incoming signal to the receiver as well as to the optical filter.

In yet another embodiment, the optically equalized signal is intensity modulated with data to be conveyed over an optical fiber.

Such intensity modulated data is conveyed via the optical fiber to another network component.

Hence, advantageously there is no need for a tunable laser to be deployed with the network component as the incoming signal is—after being filtered and equalized as described—used for modulating data to be conveyed from the network component to another network component, e.g., from an ONU to an OLT.

According to a next embodiment, the optical network component is an OLT or an ONU.

Pursuant to yet an embodiment, OOK, in particular NRZ-OOK is used as a modulation.

It is a further embodiment that the incoming optical signal is provided by an optical circulator.

The optical signal can be conveyed via a bidirectional operated optical fiber to the network component. As an alternative, unidirectional optical fibers may be utilized. In such case, the optical circulator is not required.

The problem stated above is also solved by an optical network component comprising a filter;

an optical equalizer that is connected to said filter;

a modulator that is connected to the optical equalizer.

Said optical equalizer is arranged for smoothening the output from said filter to provide a rather constant optical power output to be used for modulation purposes (to be modulated with data to be conveyed from this optical network component to another optical network component).

According to an embodiment, the optical network component comprises a splitter that conveys an incoming optical signal to the filter and to a receiver.

It is also an embodiment that the modulator modulates the output signal of the optical equalizer with a further data signal.

The problem stated supra is further solved by a communication system comprising the device as described herein.

DESCRIPTION OF THE INVENTION

The embodiment may be described regarding PONs. However, this approach is applicable as well for other types of transmission systems.

The approach provided in particular suggests a carrier recovery and reuse scheme based on an optical filter and an optical equalizer. This allows for an efficient implementation in an optical network, in particular utilizing OOK modulation, in both downstream and upstream directions of a multichannel scenario. As an example, a Carrier Recovery and Reuse Block (CRB) is provided that is in particular utilized in combination with a WDM-PON.

Figure 3:
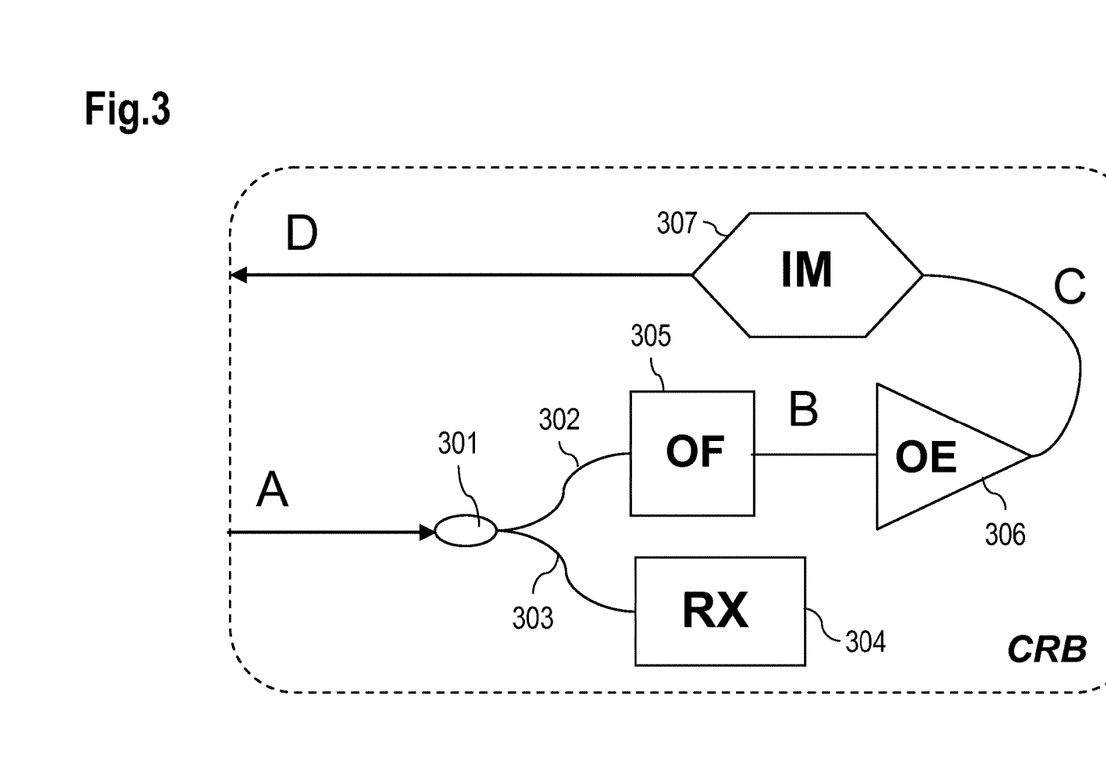
FIG. 3 shows a diagram of a Carrier Recovery and Reuse Block (CRB)

FIG. 3 shows a diagram of a CRB. An input NRZ-OOK data signal A is conveyed to a splitter 301 that provides two signals 302, 303. The signal 303 is detected by a receiver RX 304 and the signal 302 is fed to an optical filter OF 305, which processes a narrow bandpass filtering with transmission peaks at the channels wavelengths, which allows for a recovery of several optical carriers. An output signal B of the optical filter is conveyed to an optical equalizer OE 306. An output signal C of the OE 306 is conveyed to an intensity modulator IM 307 providing an intensity modulation of the signal C into a signal D, which signal D is sent upstream to the OLT.

A data extinction, i.e., an elimination of data from the signal, is achieved by a saturation property of an optical amplifier wherein a zero-level signal has a higher gain than that of a one-level signal, when applied to the filtered signal. This allows that, at the limit, these two levels became equal, meaning that an extinction ration (ER) of the signal amounts to 0 dB and the signal has a constant optical power. Thus, an optical signal, similar to a continuous wave laser output is obtained.

Figure 4:
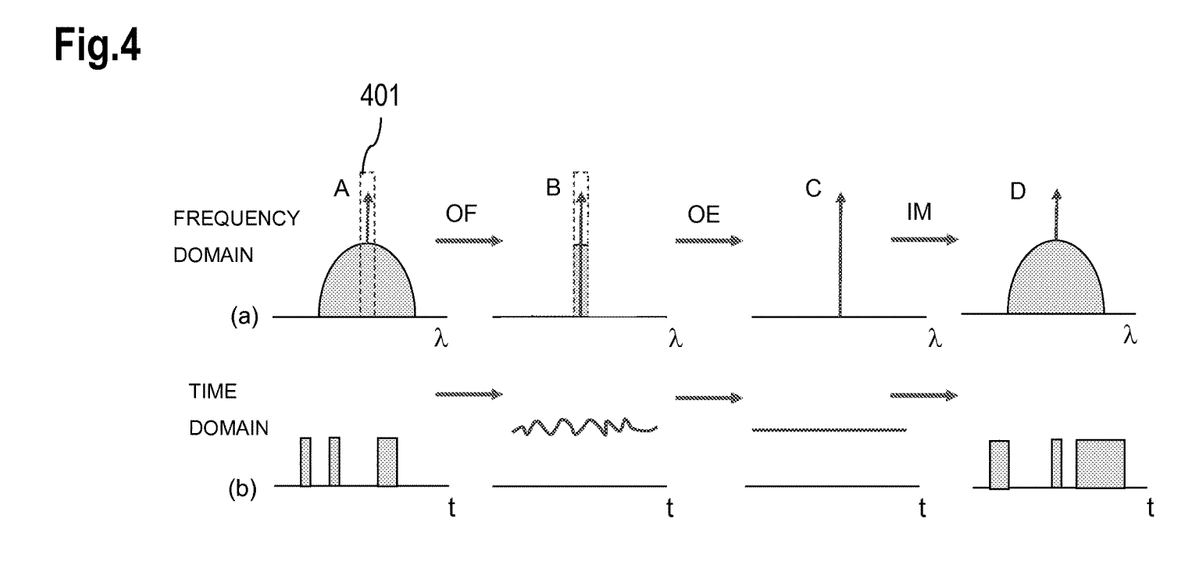
FIG. 4 illustrates various signals at various stages of the CRB of FIG. 3 comprising a frequency domain representation as well as a time domain representation for each signal.

FIG. 4 visualizes this concept for a single channel. The signals A to D mentioned above are shown in the frequency domain as well as in the time domain.

The signal A has a NRZ-OOK modulation format. In the frequency domain, the NRZ-OOK signal A shows a carrier and a sideband related to the information signal. After passing the optical filter OF 305 (shape of OF's transfer function is indicated by a dashed line 401), the signal B is obtained comprising the optical carrier. Based on the time domain representation of the signal B it is possible to observe amplitude fluctuations due to still existing modulated data. Thus, with the optical equalizer OE 306 these oscillations can be reduced or eliminated in order to obtain a constant optical power output shown as signal C. This signal C can be efficiently used for intensity remodulation with a NRZ-OOK data signal by the IM 307 into an information signal D to be transmitted.

Advantageously, in a WDM-PON, the ONU is wavelength agnostic, i.e., the ONU operates regardless of the downstream wavelength. This is achieved by utilizing an optical filter OF that filters the optical carrier and rejects the information side bands at the different possible downstream wavelengths. Hence, the CRB shown in FIG. 3 becomes agnostic CRB to other downstream wavelengths. The separation between peaks may be better than spectral occupation of modulated signals.

Figure 5:
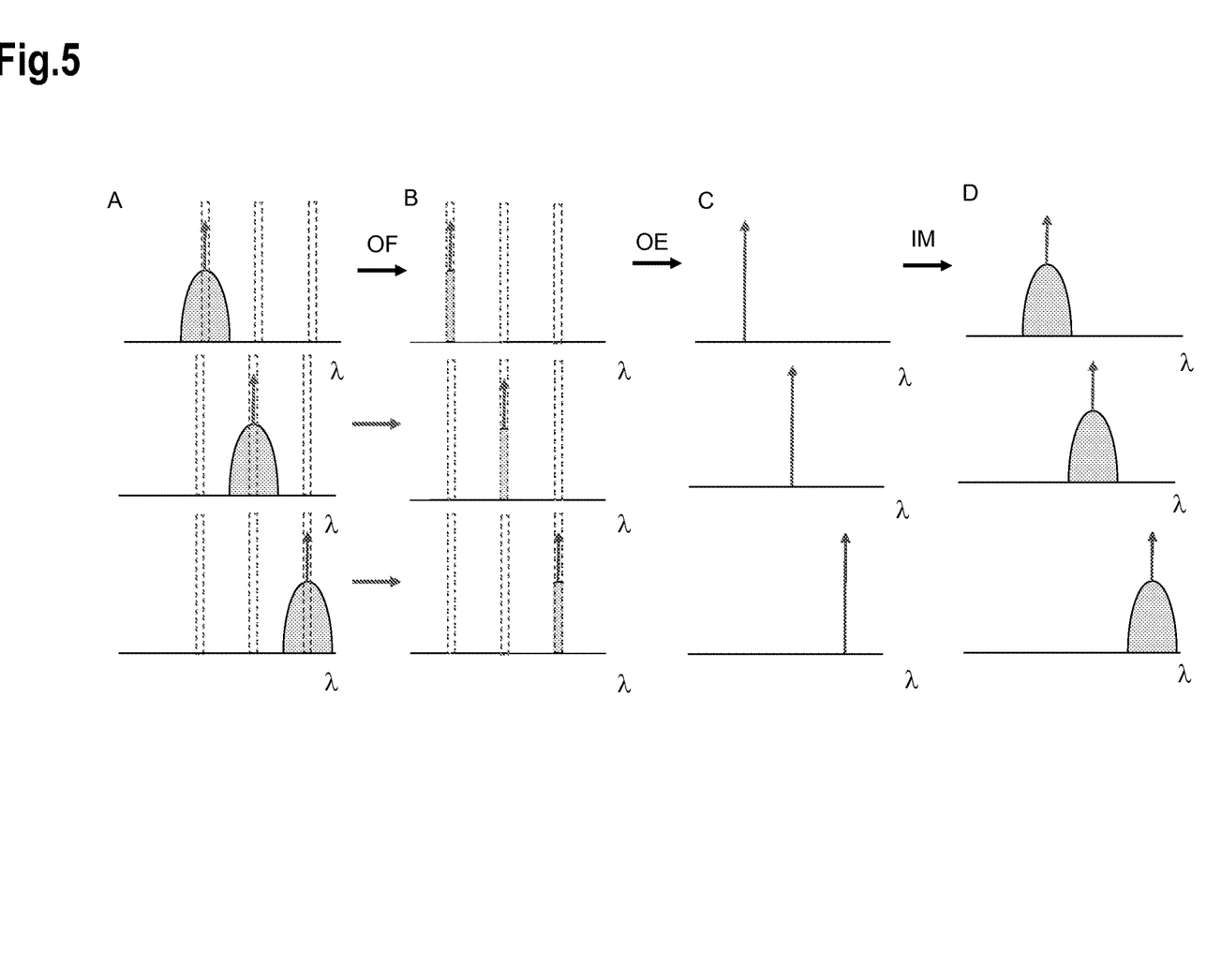
FIG. 5 illustrates wavelengths of different signals showing the agnostic wavelength processing at the CRB.

FIG. 5 shows diagrams comprising different signals A to D to visualize an agnostic wavelength operation of the CRB for three different incoming wavelengths. Using a filter characteristic with more transmission peaks, more wavelength channels could be re-used.

The approach provided allows to combine several different optical elements. The optical filtering stage may comprise a transfer function which allows filtering of the optical carriers of a WDM signal only. A free-spectral-range (FSR) of the periodic filter may be equal to the distance between adjacent channels.

A Fabry-Perot filter or a cascade of Fabry-Perot Bragg gratings (FPBG) could be used to implement said transfer function. The last proposal will be presented under "FPBG Filter" below regarding an exemplary implementation of a CRB.

Advantageously, such optical filters may provide for a rather narrow bandwidth in order to filter only the optical carrier of the downstream data signal. In a single channel scheme, a pi-shift fiber Bragg grating or a single cavity FBPG are also possible solutions.

Figure 6:
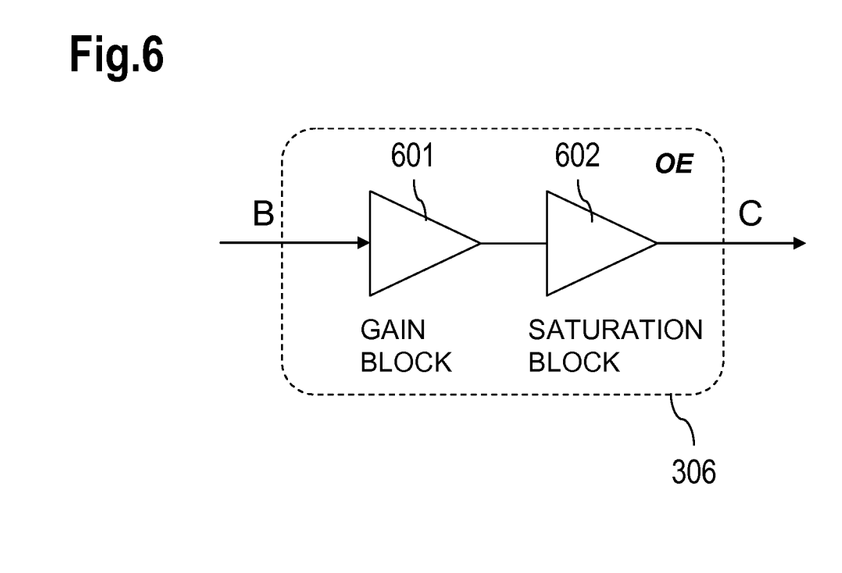
FIG. 6 shows an exemplary implementation of the optical equalizer of FIG. 3 comprising two equalization stages.

The optical equalization can be performed with an erbium doped fiber amplifier (EDFA) followed by at least one Semiconductor Optical Amplifier (SOA). FIG. 6 shows a detail of the OE 306, wherein the signal B is fed to a gain block 601 as a first SOA and the output of the gain block 601 is fed to a saturation block 602 as a second SOA. The output of the saturation block 602 corresponds to said signal C. The gain block 601 provides gain to the optical signal in order to achieve enough optical power to saturate the saturation block 602. In said saturation block 602, data reduction or extinction based on saturation property of the SOA is achieved, and the optical carrier (signal C) is generated that can be used for remodulation purposes with data in the upstream direction as described above. It is also an option, to provide a long SOA as OE 306.

The intensity modulation of the signal C is achieved by said IM 307, which can be realized as a Mach Zehnder modulator (MZM) or as an electro absorption modulator (EAM) which can be integrated with at least one SOA.

An application for the proposed CRB is the WDM-PON.

Figure 7:
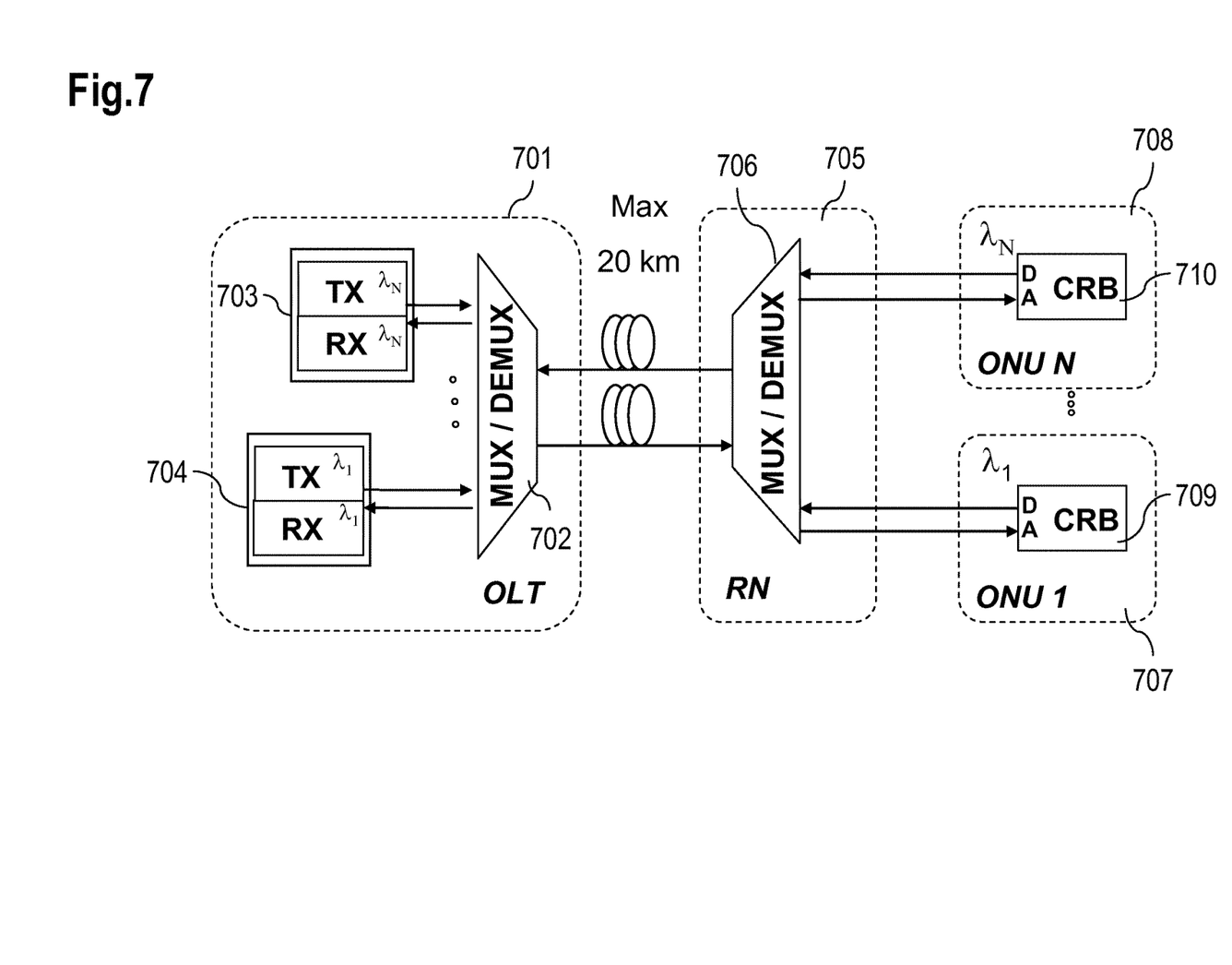
FIG. 7 shows an illustration of how a CRB can be applied to a WDM-PON, wherein the optical fibers convey unidirectional traffic.

FIG. 7 shows an illustration of how a CRB can be applied to a WDM-PON, wherein the optical fibers convey unidirectional traffic.

An OLT 701 comprises a multiplexer/demultiplexer unit MUX/DEMUX 702, to which several TX/RX-Units 703, 704 are connected, wherein each TX/RX-Unit 703, 704 is assigned to one wavelength. The OLT 701 is connected via its MUX/DEMUX 702 to a MUX/DEMUX 706 of a remote node RN 705, wherein the MUX/DEMUX 706 is connected to several ONUS 707, 708, wherein each ONU 707, 708 comprises a CRB 709, 710 with an input signal A and an output signal D. Each ONU 707, 708 is provided with a wavelength by the OLT 701 via the RN 705.

Figure 8:
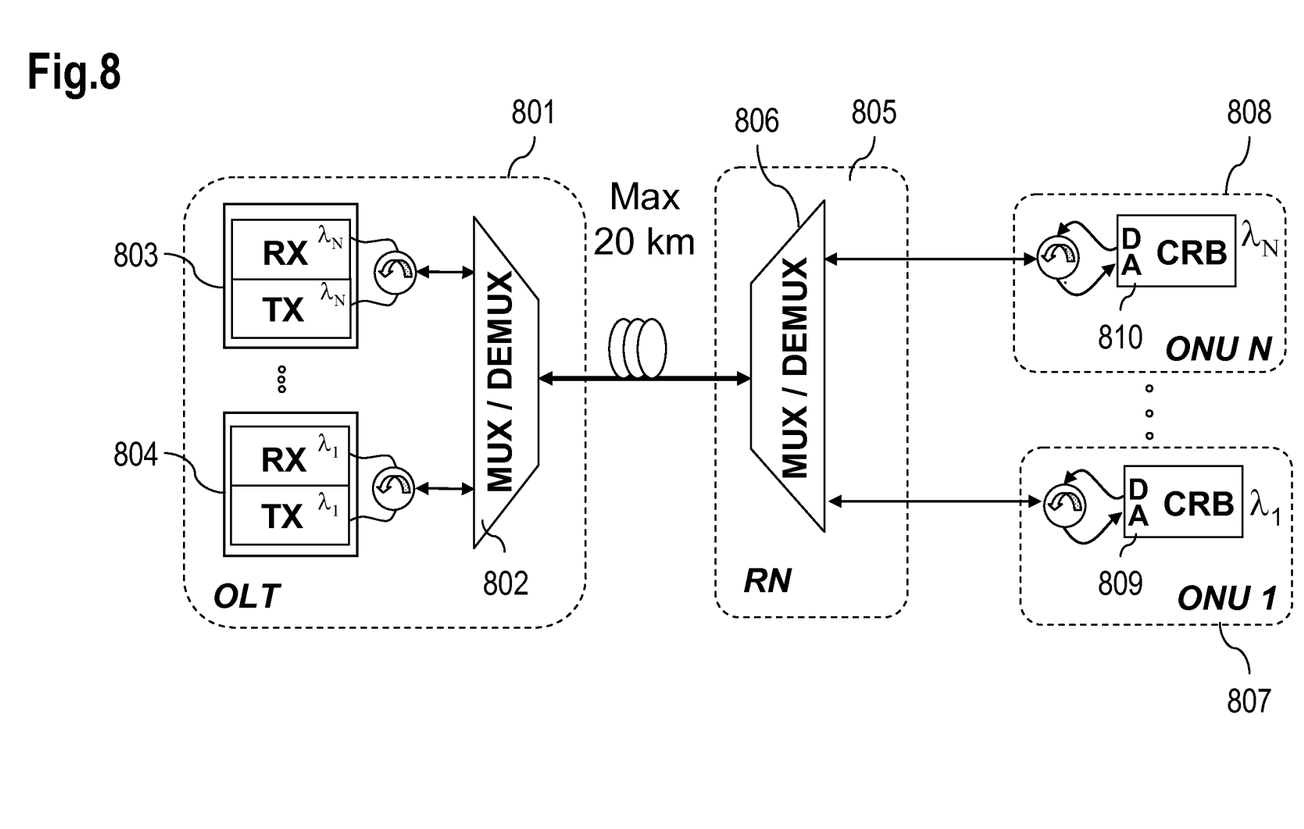
FIG. 8 shows an illustration of how a CRB can be applied to a WDM-PON, wherein the optical fibers convey bidirectional traffic.

FIG. 8 shows an illustration of how a CRB can be applied to a WDM-PON, wherein the optical fibers convey bidirectional traffic.

An OLT 801 comprises a multiplexer/demultiplexer unit MUX/DEMUX 802, to which several TX/RX-Units 803, 804 are connected via a circulator, wherein each TX/RX-Unit 803, 804 is assigned to one wavelength. The OLT 801 is connected via its MUX/DEMUX 802 to a MUX/DEMUX 806 of a remote node RN 805, wherein the MUX/DEMUX 806 is connected to several ONUS 807, 808, wherein each ONU 807, 808 comprises a circulator and a CRB 809, 810 with an input signal A and an output signal D. Each ONU 807, 808 is provided with a wavelength by the OLT 801 via the RN 805. The circulators mentioned are used to extract the downstream traffic from the single fiber as well as to convey the upstream traffic via said single fiber.

The OLT sends a NRZ-OOK signal which is multiplexed with all NRZ-OOK (of different wavelengths) and transmitted in downstream direction towards the ONUS. The WDM signal is demultiplexed at the RN, so that only one wavelength arrives at each ONU. This signal enters the CRB of the respective ONU and is replicated. One signal is directly detected by a receiver and the information converted to the electrical domain is processed. The other signal is processed by the CRB in order to perform optical carrier recovery and reuse (as described above). After being extracted and equalized, the optical carrier is intensity modulated and an output signal D of the CRB is transmitted in upstream direction to the OLT.

Such transmission system can be implemented based on separate transmission media in upstream and downstream directions as shown in FIG. 7 and based on a single fiber used as transmission medium for both upstream and downstream signals as shown in FIG. 8. In the example of FIG. 8 the OLT and ONUS need optical circulators to separate transmitted and received channels from each other.

FPBG Filter, Exemplary Embodiment

Figure 9:
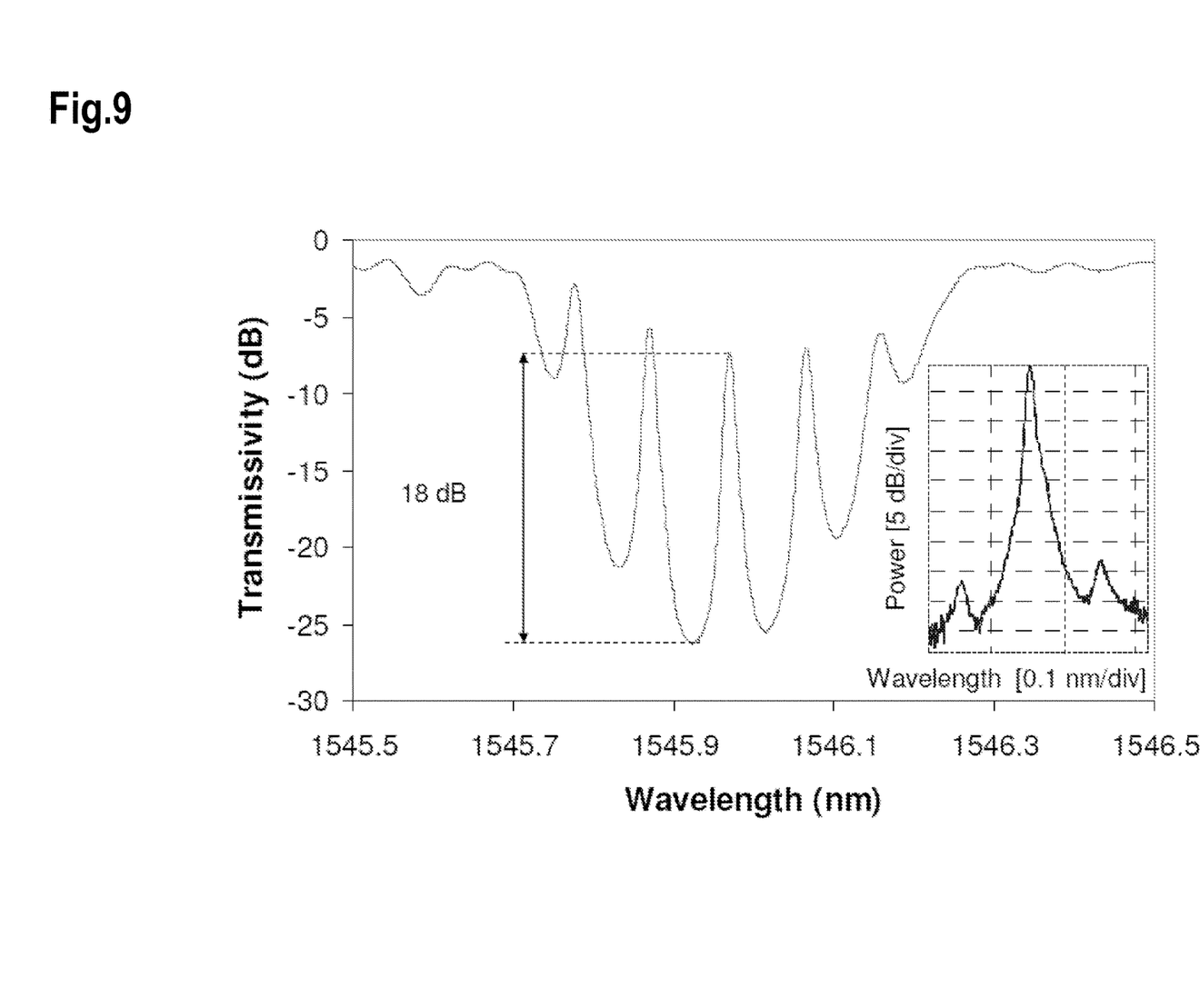
FIG. 9 shows a diagram comprising a transmission optical spectrum of a FPBG with an inset showing an optical spectrum of a recovered continuous wave.

The FPBG filter comprises two fiber Bragg gratings of 3 mm length with centers separated by a distance of about 10 mm, printed in a hydrogenated standard single mode fiber (SSMF). The spectral characterization of the FPBG filter is shown in FIG. 9. The central wavelength ($\lambda_0$) is 1546.0 nm and its rejection is about 18 dB. The OLT transmitter wavelength is tuned to $\lambda_0$.

The performance of the proposed scheme is evaluated with a NRZ signal at 10 Gbit/s and a pseudo random bit sequence (PRBS) of $2^7-1$ length. The optical spectrum of the continuous wave (CW) signal after the SOA is presented in an inset of FIG. 9. A suppression between carrier and highest adjacent discrete component is about 35 dB. Minimum extinction ratio (ER) and sequence size can be chosen to meet requirements defined in the PON current standards.

Further Advantages:
(a) This approach employs OOK (e.g., NRZ-OOK) as an efficient modulation format in downstream direction as well as in upstream direction. It allows for direct detection schemes, which are cost efficient compared to, e.g., interferometric or coherent detection implementations.
(b) An optical carrier of the downstream channel is re-used in the upstream signal, without any need of sending a separated seeding light, thus with no waste of bandwidth.
(c) The approach works with a bidirectional architecture of WDM-PON.
(d) It is possible to meet the requirements of existing PON standards, e.g., modulation format and extinction rate values.
(e) The CRB module can be realized in integrated optics, with all benefits of such an implementation.
(f) In the WDM-PON, the use of CRB may simplify wavelength management.
(g) A colorless solution at the ONU is provided, i.e., all ONUs may be equal and are able to use any wavelength available in the PON, using a filter with transmission peaks at the channel wavelengths.

LIST OF ABBREVIATIONS

ASK Amplitude shift-keying
CRB Carrier Recovery Block
DEMUX Demultiplexer
ER Extinction ratio
FBG Fiber Bragg grating
FSK Frequency shift-keying
FSR Free Spectral range
IM Intensity Modulator
MUX Multiplexer
NRZ Non-return to zero OE Optical Equalizer
OF Optical Filter
OLT Optical Line Unit
ONU Optical Network Unit
OOK On-Off keying
PON Passive Optical Network
PSK Phase shift-keying
RN Remote node
RoF Radio-over-Fiber
RX Receiver
RZ Return to zero
SOA Semiconductor Optical Amplifier
TDM time-division-multiplexing
TX Transmitter
WDM Wavelength Division Multiplexing
WDM-PON Wavelength Division Multiplexing Passive Optical Network

The invention claimed is:

1. A method for signal processing in an optical network component, the method comprising the steps of:
    receiving an incoming modulated optical signal including an optical carrier signal and upper and lower information sidebands such that there is no substantial frequency gaps between the information sidebands and the optical carrier signal;
    narrow bandpass filtering the incoming modulated optical signal to obtain a filtered signal including the optical carrier signal and a residual of the information sidebands of the modulated optical signal;
    equalizing the filtered signal to reduce or eliminate the residual of the information sideband: and to obtain the optical carrier signal; and
    modulating the optical carrier signal to generate an outgoing optical signal so that the optical carrier signal is reused.

2. The method according to claim 1, which further comprises processing a low-level signal with a higher gain than a high-level signal.

3. The method according to claim 1, wherein the equalizing the filtered signal is performed using an erbium doped fiber amplifier.

4. The method according to claim 2, which further comprises feeding the filtered signal to at least one semiconductor optical amplifier.

5. The method according to claim 1, wherein the equalizing the filtered signal is performed using at least two amplifiers.

6. The method according to claim 5, wherein the at least two amplifiers are at least two serially connected semiconductor optical amplifiers.

7. The method according to claim 1, wherein the narrow bandpass filtering of the incoming modulated optical signal uses a bandpass filter providing transmission peaks at channel wavelengths.

8. The method according to claim 1, wherein the narrow bandpass filtering of the incoming modulated optical signal employs at least one of the following:
    a Fabry-Perot filter;
    a Fabry-Perot Bragg grating; or
    a pi-shift fiber Bragg grating.

9. The method according to claim 8, wherein the Fabry-Perot Bragg grating is a single cavity Fabry-Perot Bragg grating.

10. The method according to claim 1, wherein the modulating the optical carrier signal with a Mach Zehnder modulator or an electro absorption modulator.

11. The method according to claim 1, which further comprises conveying the incoming optical signal to a receiver.

12. The method according to claim 1, which further comprises intensity modulating the optical carrier signal with data to be conveyed over an optical fiber.

13. The method according to claim 1, wherein the optical network component is an optical line terminal or an optical network unit.

14. The method according to claim 1, which further comprises carrying out on-off keying or non-return-to-zero on-off keying modulation in downstream and upstream directions.

15. The method according to claim 1, which further comprises providing the incoming optical signal with an optical circulator.

16. The method according to claim 1, wherein the filtered signal includes a plurality of optical carriers.

17. An optical network component, comprising:
    a filter arranged for receiving an incoming modulated optical signal including an optical carrier and upper and lower information sidebands such that there is no substantial frequency gaps between the sidebands and the optical carrier signal and for outputting a filtered narrow band signal including the optical carrier and a residual of the information sidebands of modulated optical signal;
    an equalizer for equalizing the filtered signal to reduce or eliminate the residual of the information sidebands of the modulated optical signal and to obtain the optical carrier; and
    a modulator arranged for additionally receiving a data signal, for modulating the optical carrier with the data signal to generate an information signal and for outputting the information signal.

18. The optical network component according to claim 17, which further comprises:
    a receiver; and
    a splitter conveying an incoming optical signal to said filter and to said receiver.

* * * * *

UNITED STATES PATENT AND TRADEMARK OFFICE
CERTIFICATE OF CORRECTION

PATENT NO. : 9,590,734 B2
APPLICATION NO. : 13/254896
DATED : March 7, 2017
INVENTOR(S) : Paulo André et al.

Page 1 of 1

It is certified that error appears in the above-identified patent and that said Letters Patent is hereby corrected as shown below:

On the Title Page

In item (75), in Column 1, Line 5, delete "Moscavide" and insert --Queluz--, therefor.

Signed and Sealed this
Twenty-third Day of May, 2017

Michelle K. Lee
*Director of the United States Patent and Trademark Office*